United States Patent Office

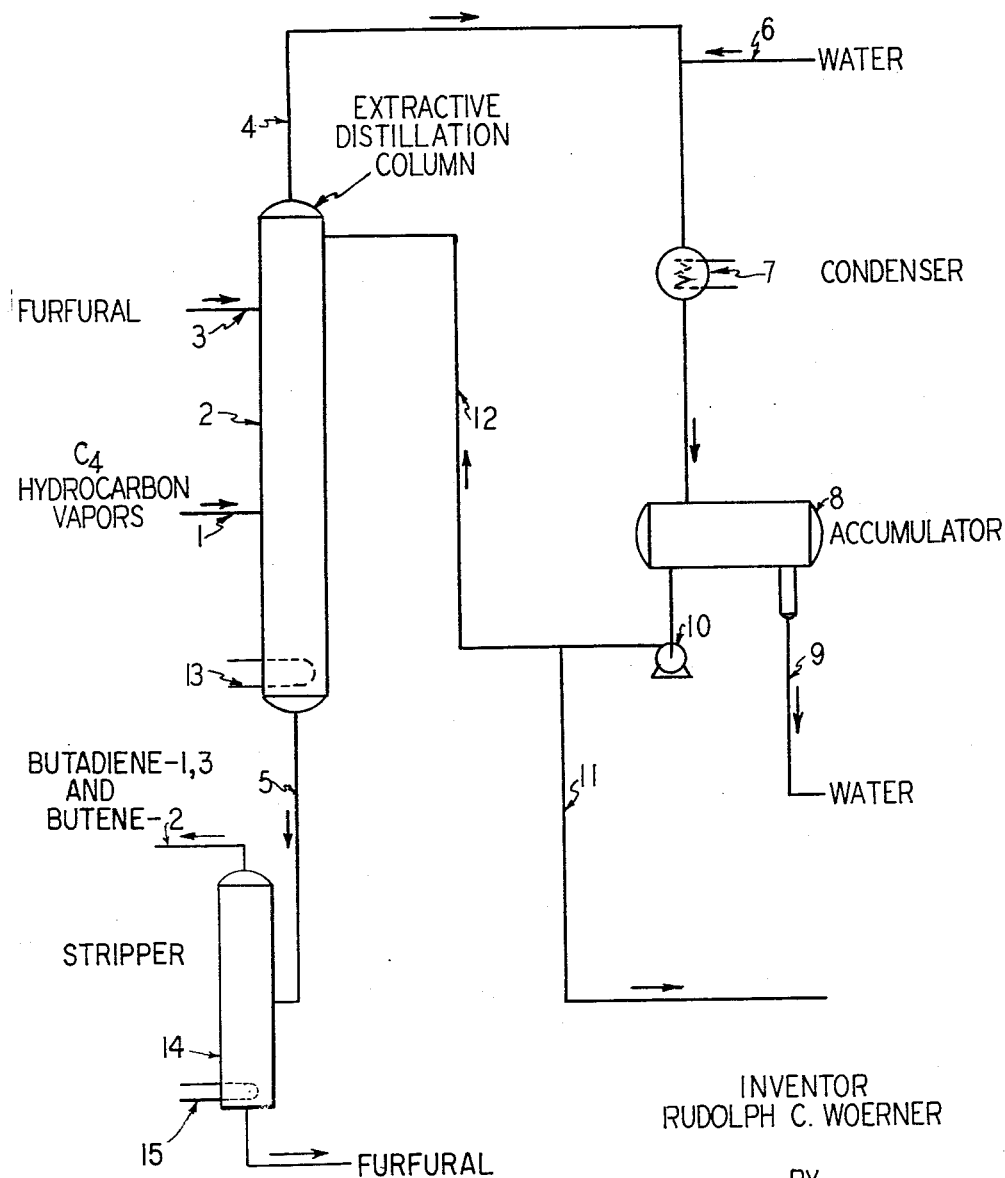

3,026,253
Patented Mar. 20, 1962

3,026,253
EXTRACTIVE DISTILLATION PROCESS
Rudolph C. Woerner, Houston, Tex., assignor to Petro-Tex Chemical Corporation, Houston, Tex., a corporation of Delaware
Filed June 23, 1958, Ser. No. 743,699
1 Claim. (Cl. 202—39.5)

This invention relates to an improvement in extractive distillation processes for the separation and purification of hydrocarbons from mixtures thereof, and relates more specifically to treating the hydrocarbon overhead from a solvent extractive distillation zone with water to remove or reduce the amount of solvent impurity in said overhead product.

Butadiene-1,3 is commercially prepared by the catalytic dehydrogenation of refinery by-product butylenes or by the catalytic dehydrogenation of n-butane to butylenes and subsequent dehydrogenation of such butylenes. Extractive distillation processes have been extensively employed for the separation and purification of $C_4$ hydrocarbons which are difficultly separated by straight fractional distillation, particularly the separation of butene-2 from n-butane and the separation of butadiene-1,3 from butene-1 and n-butane. In solvent extractive distillation, at least one hydrocarbon is removed from the system dissolved in the solvent and at least one other hydrocarbon passes from the upper area of the extractive distillation zone as unabsorbed overhead, normally in a gaseous state.

In the dehydrogenation of n-butane, a mixture of butene-1, n-butane and butene-2 (both low and high boiling isomers) is obtained. In commercial operations it is desirable to isolate and segregate the different components of this mono-olefinic mixture. Butene-1 can be separated from the mixture by fractional distillation, but the separation of butene-2 from n-butane is accomplished readily only by solvent extractive distillation.

When butylenes are catalytically dehydrogenated, after removal of light gases such as hydrogen, methane, ethylene, propylene and the like, a mixture of $C_4$ hydrocarbons is obtained which normally consists of butene-1, butene-2 (both low and high boiling isomers) and butadiene-1,3, with some n-butane and isobutylene. Complete separation of these components by fractional distillation is not possible because of the close boiling points. Also, n-butane forms an azeotrope with butadiene-1,3. However, some of the components of the described mixture of $C_4$ hydrocarbons are readily separated by solvent extractive distillation, and in such a process butene-1, n-butane, isobutylene and some butene-2 are removed as overhead gas in an extractive distillation column, and the butadiene-1,3 and a portion of the butene-2 are removed dissolved in the solvent employed in the extractive distillation. The butadiene-1,3 is subsequently separated from the butene-2 by straight fractional distillation after stripping from the solvent.

In extractive distillation processes for the separation of mixtures of $C_4$ hydrocarbons, which extractive distillation processes are well-known to those skilled in the art, a number of solvents may be employed. The most useful solvents are polar organic materials which are soluble to some extent in water. Such materials include, for example, furfural, acetone, phenol, dimethyl formamide, dimethylamine, dioxane, and the like. Dimethyl formamide, dioxane, acetone and dimethylamine are very soluble in water, phenol is very soluble in warm water and furfural is soluble in water to the extent of 8 grams per 100 grams of water at 20° C., and 20 grams per 100 grams of water at 90° C. Of these solvents, furfural is particularly efficient for the described separations, and furfural containing small amounts of water dissolved therein is extensively employed in the separation and purification of $C_4$ hydrocarbon mixtures.

In the separation and purification of $C_4$ hydrocarbons from mixtures thereof using solvents such as furfural in extractive distillation processes, some of the solvent is carried as an impurity in the overhead effluent from the extractive distillation columns. $C_4$ hydrocarbon streams containing solvents such as furfural as impurities are undesirable for many uses and purposes. Furfural, even in trace amounts as small as 35 parts per million, in overhead $C_4$ hydrocarbon streams from extractive distillation processes, cause undesirable foaming effects in later processing steps, and where mono-olefin and paraffin hydrocarbon streams are returned to dehydrogenation units, such solvents as furfural will contaminate the catalyst.

It is an object of this invention to provide an improvement in solvent extractive distillation processes for separating and purifying hydrocarbon mixture, particularly $C_4$ hydrocarbon mixtures, whereby contaminating solvent is removed from, or the amount reduced, in the overhead hydrocarbon effluent from extractive distillation zones. It is a more specific object of this invention to provide an improvement in furfural extractive distillation processes for separating and purifying $C_4$ hydrocarbons whereby furfural is not present in objectionable amounts as an impurity in overhead or non-absorbed $C_4$ hydrocarbon streams from furfural extractive distillation processes and units. Another object is the provision of an improved solvent extractive distillation process wherein the overhead product from the solvent extractive distillation zone is treated so as to be essentially free of solvent as an impurity. Other objects of the invention will be apparent from the description thereof which follows.

In extractive distillation columns employed to separate butene-2 from n-butane, and butadiene-1,3 from butene-1 and n-butane, it has been found when the solvent employed in the extractive distillation processes is furfural, that the unabsorbed overhead effluent from the column contains quantities of furfural which are undesirable and which causes the described processing difficulties. In the normal operation of solvent extractive distillation columns for the separation of butene-2 from n-butane, and butadiene-1,3 from butene-1 and n-butane, a furfural stream is introduced in the upper portion of the column, the hydrocarbon feed stream is introduced about midway of the effective fractionation zone of the column, furfural containing butadiene-1,3 and/or butene-2, depending upon the composition of the feed stream being extractively distilled, is withdrawn from the bottom of the column and unabsorbed gaseous overhead effluent from the top of the column is passed to a condenser, and a large portion of the resulting condensate is returned to the extractive distillation column as reflux. Another portion of this condensate is diverted and returned to the dehydrogenation reaction zone. In the separation of butene-1 and n-butane from butadiene-1,3 with furfural, where the feed stream to the extractive distillation column normally contains butene-1, butadiene-1,3 n-butane and butene-2, the overhead effluent from this mixture after extractive distillation contains essentially butene-1, n-butane, some butene-2 and furural as an impurity.

In an effort to eliminate furfural in the overhead effluent stream from the extractive distillation column in the separations described above, the furfural is normally introduced several trays below the top of the column, and the rising furfural and hydrocarbon vapors are contacted by the reflux and thus entrapped. It has been found that in a 100-tray column employed for extractive distillation of $C_4$ hydrocarbon mixtures containing substantial amounts of butadiene-1,3, butene-1, butene-2 and n-butane, with furfural, that when the furfural was introduced on the 4th tray from the top of the column that the overhead from said column contained 35 and more parts per million of furfural. By lowering the solvent entry point to the 8th tray from the top of the column, thereby increasing the fractionation trays from 4 to 8, the overhead effluent stream contained 25 to 30 parts per million of furfural, which amount of furfural in that portion of the condensate overhead which was recycled back through dehydrogenation plant operations caused harmful effects in subsequent processing operations. It is neither economical nor practical to introduce the furfural still lower in standard extractive distillation columns.

It was found, quite unexpectedly, that the introduction of a small amount of water into the overhead vapor line containing the effluent from the top of the extractive distillation column, at some point between the column and a condenser, with subsequent separation of water from the condensed hydrocarbon effluent, resulted in hydrocarbons from the condenser containing 3 parts per million or less of furfural contained therein. By means of this step, a simplified and readily controlled means of reducing the solvent content of the unabsorbed hydrocarbon overhead effluent from extractive distillation columns is realized.

The appended drawing is a schematic flow plan of a portion of an extractive distillation system for the separation of butadiene-1,3 and butene-2 from butene-1 and n-butane illustrating one embodiment of this invention.

A mixture of vaporized $C_4$ hydrocarbons containing, essentially, butadiene-1,3, n-butane, butene-2 and butene-1 is charged through line 1 to an extractive distillation column 2 equipped with reboiling means 13. Lean furfural containing 8% water is charged to the extractive distillation column 2 through line 3. Overhead unabsorbed hydrocarbon gas, containing butene-1, n-butane and some butene-2, from the extractive distillation column 2 passes through line 4 to the condenser 7. Water is introduced into line 4 through line 6 at a point between the extractive distillation column 2 and condenser 7. The unabsorbed overhead hydrocarbon vapor containing water from line 6 is condensed in condenser 7 and fed to accumulator 8 where the water containing furfural is continuously withdrawn through line 9. The essentially furfural-free hydrocarbon condensate is passed through pump 10 and is split, one portion going through line 12 to the extractive distillation column 2 as reflux and a smaller portion being diverted through line 11 as recycle to the catalytic dehydrogenation zone, not shown. The rich furfural containing butadiene-1,3 and at least a portion of the butene-2 is passed through line 5 to the stripper 14 equipped with reboiling means 15 and subsequently to a fractional distillation column, not shown.

The amount of water employed may be varied from about one-half to about ten percent or more and the amount of water used is based, for convenience, on the amount of effluent being condensed. It should be noted that amounts of water less than about one-half percent will result in some reduction of the solvent content, particularly furfural, of the condensed hydrocarbon effluent, but better results are normally obtained when the amount of water employed is from about 1 percent to about 5 percent based on the weight of condensed hydrocarbons. For example, on a plant scale, to remove the furfural solvent impurity from the overhead effluent from an extractive distillation column used to separate butene-2 from n-butane, the gaseous effluent being condensed at the rate of 600 barrels per hour; when 15 barrels per hour of water (2.5 volume percent) are introduced continuously into the vapor line just ahead of the condenser, the furfural content of the condensed hydrocarbon product, after separation of the water therefrom, is reduced from about 30 to 40 parts or more per million of furfural when no water is added, to 3 parts or less per million of furfural. Larger amounts of water, as high as 10 percent or more, can be employed, if desired, but such larger amounts of water normally are not necessary, and separators or accumulators of increased size must be employed to remove the larger amounts of water from the condensed hydrocarbon, and there is some loss of hydrocarbon which will be dissolved in water in the described process, and this will either be lost or must be recovered by an additional step. Normally, it is desirable to employ an amount of water to remove at least 50 percent or more of the solvent impurity from the hydrocarbon; and more preferably, the solvent content of the overhead hydrocarbon is reduced to less than about 10 parts per million.

Although the most efficient use of this invention is realized when water is introduced into the overhead effluent line between the extractive distillation column and the condensing means, the water may be introduced at other points in the system and reduction in solvent content of the condensate realized in accordance with this invention. For example, the water may be introduced directly into the condensers or it may be added as part of an additional operation to an accumulator or separator; the water may be introduced into the top of the extractive distillation column, above the point of entry of the solvent, or may be added to the reflux returning to the extractive distillation column, and in this case any excess water going down the column may be withdrawn in a trap from the tray above the point of solvent entry. For ease of operation and control, the water is most efficiently introduced into the vapor overhead effluent line from the extractive distillation column between the column and condenser. This mode of introduction of the water provides excellent mixing of water and hydrocarbon. It should be noted that water introduced into the system in this manner is relatively independent of and bears no direct relation to the water content of the solvent normally used in extractive distillation processes. Most extractive distillation processes for the separation and purification of $C_4$ hydrocarbons employ polar solvents which have a substantial degree of solubility in water and are soluble in water, and from about 2 percent to about 10 percent water is normally employed with such solvents. As described above, the water used to remove impurities from the overhead of the extractive distillation system is essentially independent of the furfural flow in the extractive distillation column. The operational area involved in the preferred embodiment of this invention in the extractive distillation system, including the area of the column above the entry point of the solvent, the line to the condenser, the condenser, the separator, line and pump back to the column, may be identified as the "reflux zone" and it is in this zone that the water is introduced in accordance with this invention.

The water containing the solvent dissolved therein is readily separated from the condensed hydrocarbons in any separation means such as an accumulator or separator by any of the methods and equipment known to those skilled in the art. If the water is added in the condenser, provision preferably should be made to insure adequate mixing.

In one embodiment of this invention, a $C_4$ hydrocarbon stream containing about 29% butadiene, 33% butene-1, 26% butene-2, 5% isobutylene, 6% n-butane, and traces of vinyl acetylene is extractively distilled with furfural to separate butadiene-1,3 therefrom. This hydrocarbon stream is obtained as a product of butylenes which have been dehydrogenated, depropanized and depentanized in conventional fractional distillation columns. The hydrocarbon stream is vaporized and introduced at 75 p.s.i. into the center of the effective extractive distillation zone of an extractive distillation column of 100 trays at a rate of 470 barrels per hour. To the extractive distillation column, at the 8th tray from the top of said column, 2780 barrels per hour of furfural containing 8 percent water is introduced at a temperature of about 120° F. The column is operated at 110° F. under conditions such that 760 barrels per hour of condensed overhead is obtained. 450 barrels per hour of this overhead are returned as reflux to said column and 310 barrels per hour of the condensate are recycled to the butylene dehydrogenation reactors. This recycled product contains about 55% butene-1, about 10% n-butane, about 29% butene-2, about 8% isobutylene and also contains about 30 parts per million of furfural. By introducing 15 barrels per hour of water into the overhead vapor line between the top of the extractive distillation column and the condenser, at a point in the line just ahead of the condenser, condensing the overhead vapor in a condenser, feeding to a separator and drawing off the water containing furfural from the treated hydrocarbon condensate in the separator, the resulting condensed hydrocarbon from the separator contains about 3 parts per million of furfural. When water is not added to the overhead, the recycle material contains about 30 or more parts per million of furfural as an impurity. Quite unexpectedly, variation in solvent feed return, hydrocarbon feed return, temperature and pressure in the system apparently have little effect on the furfural content, at this low concentration, of the overhead hydrocarbon effluent from the extractive distillation zone. When 10 and 20 barrels of water per hour are introduced, as described above, in the same system, similar excellent results are obtained and condensate returned as reflux and recycle contains 5 or less parts per million of furfural. The butadiene-1,3 and some of the butene-2 are removed from the extractive distillation column dissolved in the furfural, are subsequently stripped from the furfural, and fractionally distilled to provide 98.5% butadiene-1,3.

In another embodiment of the invention, a butylene stream obtained from refinery operations is treated in accordance with this invention to prepare feed stock for the dehydrogenation reactors. As a first step, the butylene stream is prefractionated to remove n-butane, butene-2 and pentane from the mixture, and the overhead consists of propane, isobutane, isobutylene and butene-1. The bottoms stream of n-butane, butene-2 and pentane from this fractionator is fed to a depentanizer where pentane is separated from the n-butane and butene-2. The n-butane and butene-2 overhead from the depentanizer is charged to an extractive distillation solvent tower as described above to separate n-butane from butene-2 with furfural, with n-butane going overhead and the butene-2 being taken out of the system dissolved in the furfural. Introduction of water in an amount of 2.5% introduced in the overhead line between the top of the extractive distillation column and the condenser, and subsequent separation of water from the condensate, reduces the furfural content of the condensed n-butane overhead product to 3 parts per million of furfural or less. When the operation is conducted in the absence of water, the condensed overhead normally contains 30 or more parts per million of furfural. This embodiment of the invention is also readily performed and illustrated with butylene feed stocks from butane dehydrogenation reactors.

The water in each of the above-described embodiments is added continuously to the overhead and while this is the preferred technique for ease of operation and control, intermittent addition of water is satisfactory and useful so long as the hereinabove defined and required amounts of water are used, based on the amount of overhead being condensed, and adequate mixing of the water and hydrocarbon overhead is obtained.

The principle of this invention is readily applied to another step in extractive distillation systems. When butadiene-1,3 and/or butene-2 are separated from n-butane in solvent extractive distillation processes, the butadiene-1,3 and/or butene-2 are removed dissolved in the solvent, such as furfural. The absorbed hydrocarbons normally are separated from the solvent by a stripping operation in a column. The fat solvent, such as furfural containing butadiene and/or butene-2, is fed to a stripping column, for example one containing 35 trays, at about the center of the column, and operating the column under conditions such that the hydrocarbon is stripped with dry heat from the fat solvent. The butadiene-1,3 and/or butene-2 go overhead, are condensed, and the condensate passes through an accumulator. A portion of the condensate is fed back to the stripping column as reflux, and a major portion is fed the final distillation column in the case of mixtures of butadiene-1,3 and butene-2 to separate butadiene-1,3 from the butene-2. Where the separation is n-butane from butene-2 and the fat solvent contains essentially butene-2, the overhead product butene-2 goes to dehydrogenation reactors. To eliminate processing difficulties in later processing steps, as described above, and to remove the solvent impurity, such as furfural, from the condensed hydrocarbons, water is introduced into the system as described hereinabove at a point in the overhead line between the stripping column and the condenser, in the concentrations defined above, as from 1 to 5 percent, and the water containing the solvent impurity is removed from the condensed hydrocarbon in the accumulator or a separator.

Although the invention has been illustrated with specific $C_4$ hydrocarbon mixtures, the invention is readily applied to other hydrocarbon mixtures which are separated by extractive distillation with polar solvents, which solvents are a source of undesirable impurity in overhead hydrocarbon streams from the extractive distillation zones. Likewise, the principles of this invention are readily applied to extractive distillations employing other water-soluble polar organic solvents, such as dioxane, dimethylamine, acetone, phenol, and the like.

From the foregoing description of the invention, it will be seen that the novel improvement in extractive distillation processes for separating the components of hydrocarbon mixtures is useful and valuable. It is apparent that various embodiments and modifications of the invention, in addition to those specifically disclosed and illustrated by example, may be employed by the man skilled in the art without departing from the spirit and scope of the invention as defined in the appended claim.

I claim:

A process for the separation of a $C_4$ hydrocarbon mixture comprising isobutylene, butene-1, butene-2, n-butane and butadiene-1,3 which comprises feeding said hydrocarbon mixture to an extractive distillation column about midway of the effective fractionation zone of the column; feeding an aqueous furfural solution in the upper portion of the column at a point above the feed point for said hydrocarbon mixture; taking off as bottoms the butadiene-1,3 and a portion of the butene-2 dissolved in the aqueous furfural solution, stripping with heat the said bottoms to strip off the butadiene-1,3 and butene-2; taking off as overhead the unabsorbed overhead hydrocarbon mixture containing isobutylene, butene-1, n-butane, a portion of the butene-2 and furfural as an impurity, condensing said overhead in a condenser, adding from about 1 to 5 percent of water to the line conducting the overhead to the condenser, the percent of said water being based on the weight of effluent being condensed, passing the condensate from said condenser to an accumulator, separating in the accumulator the water and furfural from the hydrocarbon mixture containing butene-1, n-butane and butene-2, whereby the said hydrocarbon mixture contains less than 10 parts per million of furfural and whereby at least 50 percent of the furfural coming off as overhead from said extractive distillation column has been removed by way of the furfural and water stream from the accumulator.

References Cited in the file of this patent

UNITED STATES PATENTS

| | | |
|---|---|---|
| 2,377,049 | Souders | May 29, 1945 |
| 2,411,785 | Hachmuth | Nov. 26, 1946 |
| 2,423,795 | Patterson | July 8, 1947 |
| 2,487,184 | Rupp | Nov. 8, 1949 |
| 2,520,006 | Hibshman | Aug. 22, 1950 |
| 2,742,411 | Leary et al. | Apr. 17, 1956 |